Feb. 11, 1941.   W. J. RINGLE   2,231,351
ROLLER BEARING
Filed June 21, 1940
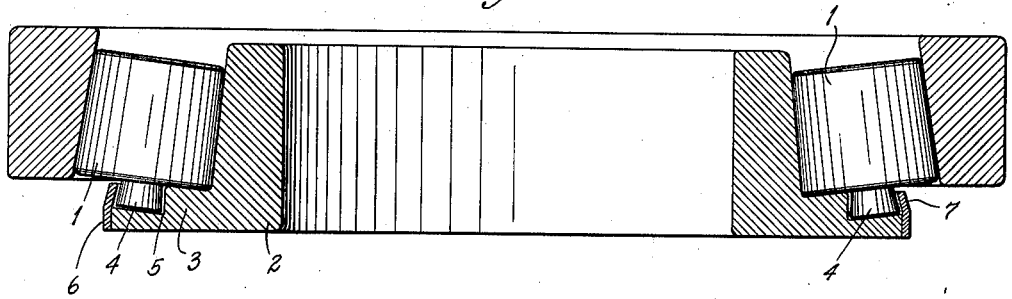
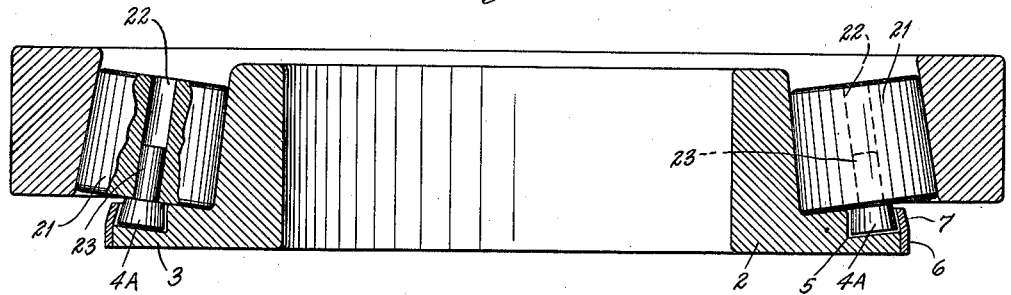
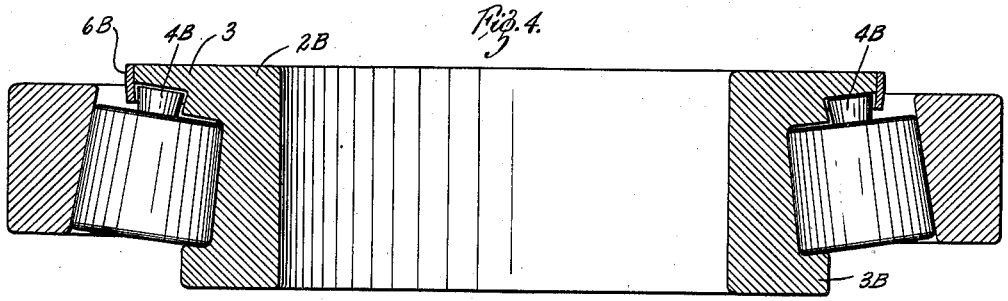
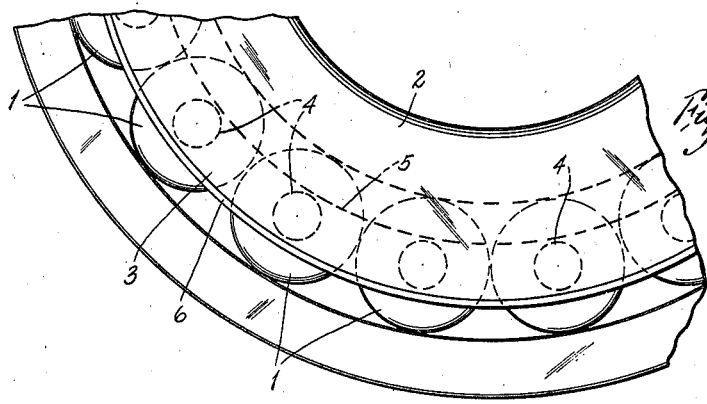
INVENTOR:
William J. Ringle,
by Cantlan & Gravely,
HIS ATTORNEYS Patented Feb. 11, 1941

2,231,351

UNITED STATES PATENT OFFICE 2,231,351

ROLLER BEARING

William J. Ringle, Canton, Ohio, assignor to The Timken Roller Bearing Company, Canton, Ohio, a corporation of Ohio Application June 21, 1940, Serial No. 341,657

3 Claims. (Cl. 308—214)

My invention relates to roller bearings, particularly tapered roller bearings of the type wherein the rollers have pintles and has for its principal object a simplification of this type of bearing to permit securing of the rollers on the bearing member by means of a member cooperating with pintles on one end only of the rollers. Other objects and advantages will appear hereinafter.

The invention consists principally in a tapered roller bearing and cone construction, wherein each roller has a conical pintle at only one end thereof, said pintle tapering toward the body of the roller and wherein said bearing cone has an annular retaining sleeve having a conical portion extending over the pintles of the bearing rollers. The invention further consists in the tapered roller bearing and in the parts and combinations and arrangement of parts hereinafter described and claimed.

In the accompanying drawing—

Fig. 1 is a longitudinal sectional view of a tapered roller bearing embodying my invention, Fig. 2 is a partial end view, Fig. 3 is a sectional view, similar to Fig. 1, showing a modification; and Fig. 4 is a similar sectional view showing another modification.

As shown in Fig. 1, a series of tapered bearing rollers 1 are mounted on a cone 2 or inner bearing member having a thrust rib 3 at the larger end of its raceway. Each roller 1 has a conical pintle 4 at its larger end, which pintle 4 tapers toward the body of the roller 1. The thrust rib 3 is a high rib that projects radially beyond the circle of the large ends of said pintles and is provided with a rabbet or recess 5 on its inner face into which said pintles 4 extend. Secured to the outer periphery of said rib is a retaining sleeve 6 having a conical portion 7 extending over the conical surface defined by the series of pintles and thus preventing removal of the rollers from the cone.

Various assembly methods may be used. A preferred method is to press the ring over the cone rib with all rollers in place, roll the innermost portion of the ring into conical shape, over the roller pintles and then spot weld the ring to the rib at a number of points.

In the modification shown in Fig. 3, the rollers 21 have axial bores 22 and the pintles 4a are separate members, held in position by means of projecting stems 23 that are forced into the axial bores 22 of the rollers 21.

In the modification shown in Fig. 4, the pintles 4B are on the small ends of the rollers and the retaining sleeve 6B is on a rib 3 on the small end of the cone 2B. The thrust rib 3B of this construction may be lower in height than that of Fig. 1, thus reducing the amount of material needed to make the cone. In this construction also, the rollers and cone are a self-contained assembly.

The above described bearing eliminates the cage usually required to hold bearing rollers on the cone, a simple sleeve on the cone itself serving the purpose of the usual cage. The modifications of Figs. 1 and 3 permit elimination of the rib commonly used on the small end of a bearing cone. Obviously this simple construction has important advantages in use.

What I claim is:

1. A tapered roller bearing comprising a bearing cone having a rib at one end, a series of tapered rollers on said cone, each roller having a conical pintle at the end adjacent to the cone rib, said pintles tapering toward the bodies of the rollers and a sleeve on said cone rib, said sleeve having a conical portion extending over the roller pintles.

2. A tapered roller bearing comprising a bearing cone having a rib at the larger end of its raceway, a series of tapered rollers on said cone, each having a conical pintle at its larger end, adjacent to the cone rib, said pintles tapering toward the bodies of the rollers and a sleeve on said cone rib, said sleeve having a conical portion extending over the roller pintles.

3. A tapered roller bearing comprising a bearing cone having a rib at one end, a series of taper rollers on said cone, each having a conical pintle at the end adjacent to the cone rib, said pintles tapering toward the bodies of the rollers and said cone rib extending radially beyond the circle of said roller pintles and being rabbeted around the outer periphery of its inner face to accommodate said roller pintles and a sleeve on said cone rib, said sleeve having a conical portion extending over the roller pintles.

WILLIAM J. RINGLE.